United States Patent [19]
Wells

[11] Patent Number: 5,435,655
[45] Date of Patent: Jul. 25, 1995

[54] BEARING ASSEMBLY WITH SLOTTED CLOSURE CUP

[75] Inventor: David E. Wells, Shawnee, Okla.

[73] Assignee: L&S Bearing Co., Oklahoma City, Okla.

[21] Appl. No.: 297,348

[22] Filed: Aug. 29, 1994

Related U.S. Application Data

[63] Continuation-in-part of Ser. No. 152,607, Nov. 15, 1993, Pat. No. 5,344,241.

[51] Int. Cl.⁶ ............................................. F16C 33/76
[52] U.S. Cl. ..................................... 384/607; 384/620
[58] Field of Search ............... 384/484, 485, 606, 607, 384/609–617, 618–623, 571

[56] References Cited

U.S. PATENT DOCUMENTS

| | | | |
|---|---|---|---|
| 3,268,279 | 8/1966 | Greby | 384/607 |
| 3,365,040 | 1/1968 | Pitner | 384/618 |
| 3,519,317 | 7/1970 | Spence et al. | 384/614 |
| 3,639,016 | 2/1972 | Bourgeois . | |
| 4,106,781 | 8/1978 | Benjamin | 277/82 |
| 4,162,110 | 7/1979 | Gardella . | |
| 4,204,720 | 5/1980 | Otani | 384/607 |
| 4,313,644 | 2/1982 | Dagiel | 384/607 |
| 4,325,591 | 4/1982 | Otto . | |
| 4,448,461 | 5/1984 | Otto . | |
| 4,478,461 | 10/1984 | Leiber . | |
| 4,497,495 | 2/1985 | Christiansen | 277/50 |
| 4,592,666 | 6/1986 | Jornhagen | 384/477 |
| 4,808,012 | 2/1989 | Otto | 384/482 |
| 4,913,450 | 4/1990 | Asberg . | |
| 4,958,947 | 9/1990 | Peter | 384/609 |
| 5,005,992 | 4/1991 | Dreschmann | 384/484 |

FOREIGN PATENT DOCUMENTS

| | | |
|---|---|---|
| 2051119 | 2/1971 | France . |
| 9310179 | 2/1993 | Germany . |

OTHER PUBLICATIONS

"Easy Steer" product brochure, Rockwell International, no month 1992 German drawing date stamped Jan. 25, 1991.

*Primary Examiner*—Thomas R. Hannnon
*Attorney, Agent, or Firm*—Mary M. Lee

[57] ABSTRACT

A tapered roller thrust bearing assembly with an internal seal and slotted closure cup. The seal is affixed to the inner surface of the closure cup and is totally enclosed thereby. A flexible flange portion on the seal prevents entry of debris into the bearing assembly, yet permits grease to exit the assembly. Because it is totally contained within the closure cup, the seal is protected from injury and wear. Moreover, production of the bearing assembly is simplified. The closure cup has a side wall with a number of slots which extend from the open end of the closure cup to an intermediate point of the side wall. The slots increase the area for the escape of grease during lubrication of the bearing assembly. The slots also allow for improved consistency in crimping or bending of the side wall of the closure cup during assembly.

23 Claims, 2 Drawing Sheets

BEARING ASSEMBLY WITH SLOTTED CLOSURE CUP

CROSS-REFERENCE TO RELATED APPLICATIONS

This application is a continuation-in-part of U.S. Ser. No. 08/152,607, filed Nov. 15, 1993, U.S. Pat. No. 5,344,241 and entitled "Bearing Assembly With Internal Seal."

FIELD OF THE INVENTION

The present invention relates generally to bearing assemblies and, more particularly, to tapered roller thrust bearings with internal seals.

DETAILED DESCRIPTION OF THE PREFERRED EMBODIMENTS

For proper lubrication of a bearing assembly, it is desirable to construct the assembly so that grease can flow through the assembly. Yet, to extend the useful life of the assembly, it is necessary to reduce the extent to which foreign matter such as debris and water can invade the interior of the assembly and rust or otherwise interfere with the function of the roller elements. The bearing assembly of the present invention meets these objectives while at the same time reducing the cost of manufacture, simplifying the assembly process and providing improved consistency in the shape sustaining capacity of the components.

In accordance with the present invention there is provided a tapered roller thrust bearing with an internal seal. The seal is affixed to the inner surface of the closure cup and is totally enclosed thereby. An angled, flexible flange portion on the seal prevents entry of debris and water into the bearing assembly, yet permits grease to exit the assembly. Because it is totally contained within the closure cup, the seal is protected from injury and wear. Moreover, production of the bearing assembly is simplified. These and other advantages of the present invention will be apparent from the following description of preferred embodiments.

Figure 1:
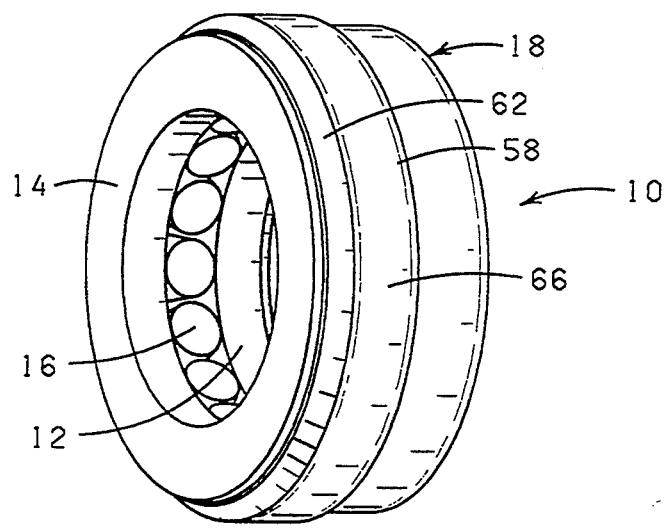
FIG. 1 is a perspective view of a tapered roller thrust bearing assembly constructed in accordance with the present invention.
Figure 2:
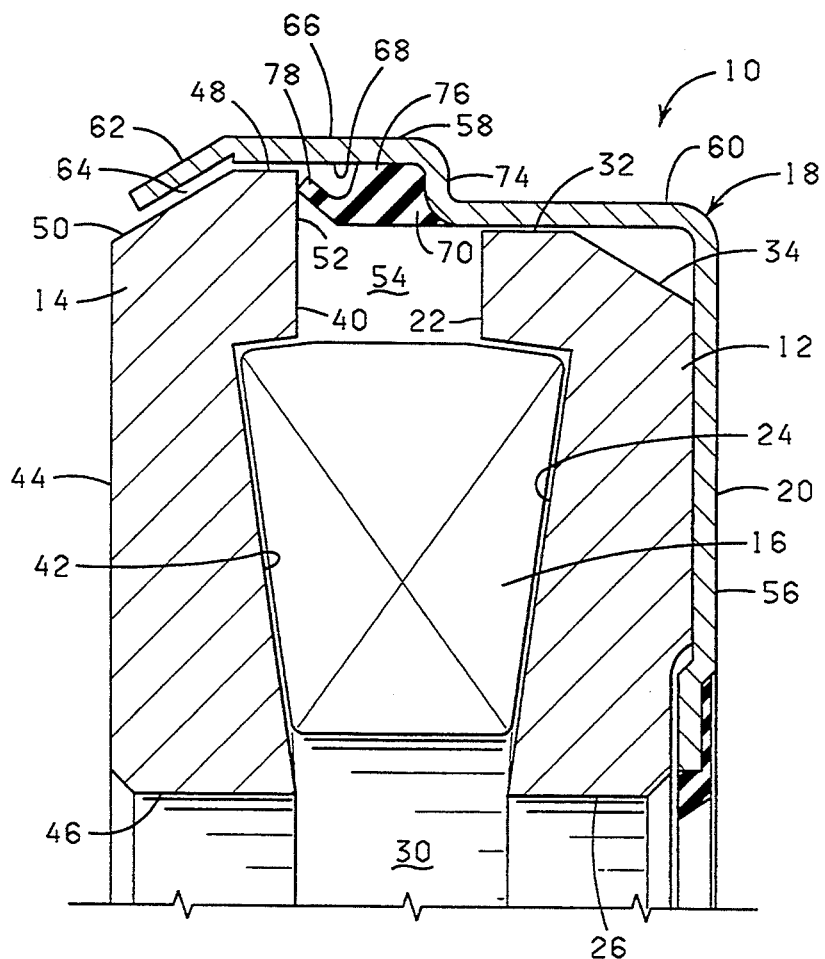
FIG. 2 is an enlarged, fragmented sectional view of the bearing assembly shown in FIG. 1.

Embodiment of FIGS. 1 and 2

With reference now to the drawings in general and to FIG. 1 in particular, there is shown therein a bearing assembly constructed in accordance with the present invention and designated by the reference numeral 10. The bearing assembly comprises first and second annular races 12 and 14 and a plurality of rollers 16 which are contained in operative relationship by a closure cup 18.

As best seen in FIG. 2, the assembly 10 is a tapered roller thrust bearing assembly in which the rollers are frustoconical in shape. It will be appreciated, however, that the present invention may be applied to other types of thrust bearings, such as those comprising cylindrical roller elements.

The first annular race 12 has an upper surface 20 and a lower surface. 22. The lower surface defines a roller receiving recess 24 which is shaped to conform to and receive the selected roller. The first annular race 12 has an inner surface 26 which partially defines a central bore 30 which extends through the entire assembly in a known manner. The first annular race 12 has an outer peripheral surface 32 which may have a beveled upper edge or shoulder 34.

The second annular race 14 has an upper surface 40 which defines a roller receiving recess 42 shaped to conform to the roller 16. The race 14 has a lower surface 44 and an inner surface 46 which also partially defines the central bore 30. The race 14 has an outer peripheral surface 48 which includes an annular shoulder 50 which slopes inwardly to intersect the lower surface 44. The external diameter of the second race 14 at its widest part is greater than the external diameter of the first race 12 at its widest part, and the upper surface 40 of the second race 14 extends radially beyond the lower surface 22 of the first race 12 to form an annular shelf 52. The lower surface 22 of the first race 12 is spaced a distance from the upper surface 40 of the second race 14 to form an annular chamber 54 which is defined inwardly by the end of the roller 16 and outwardly by the closure cup 18.

As indicated above, the closure cup 18 contains the first and second races 12 and 14 and the rollers 16 in operative relationship. To this end, the closure cup 18 has a top wall 56 which at least partially encloses and preferably is parallel to the upper surface 20 of the first race 12.

The closure cup 18 also has a side wall 58 extending down from the top wall 56. The side wall 58 of the closure cup 18 has a first portion 60 which generally encloses the peripheral surface of the first race 12. To conform to and enclose the peripheral surface 48 and the shoulder 50 of the second race 14, a lip portion 62 is provided at the lower end of the side wall 58. The inner surface of the lip portion 62 is spaced a distance from the outer peripheral surface 48 to form an annular space 64 which communicates with the annular chamber 54.

Between the lip portion 62 and the first portion 60 of the side wall 58 there is a central portion 66, and the inner surface 68 of the central portion forms the peripheral wall of the chamber 54, as described previously. The inner surface 68 includes an inner seal receiving space for supporting an internal seal 70 in the chamber 54.

In the preferred construction, the central portion 66 has a diameter greater than the first portion 60 of the closure cup 18 forming a shoulder 74 between the first portion and the central portion. While the seal 70 may take various shapes, the illustrated configuration includes a body portion 76 which is generally rectangular in cross-section and a flange portion 78 extends toward the upper surface 40 to contact the shelf portion 52. The body portion 76 has surfaces which conform to the seal receiving space formed by the inner surface of the central portion 66 and the shoulder 74 of the side wall 58 of the closure cup 18. In the preferred embodiment, the flange 78 extends from the inner corner of the body portion 76 and is directed at an acute angle toward the side wall 58 of the closure cup 18.

The seal 70 preferably is integrally formed of a flexible rubber composition, such as nitrile, or some other suitable material. The seal 70 is affixed in the seal receiving space by bonding or some suitable method.

Now it can be seen that the annular space 64, which is open at the lower edge of the lip portion 62, is divided from the chamber 54 by the flange 78. Because of the angled configuration of the flange 78, it acts as a sort of flap valve. Thus, entry of foreign fluids such as water and debris through the annular space 64 into the chamber 54 and the interior of the bearing assembly 10 is prevented. On the other hand, because of the flexibility of the material and again the angled shape of the flange 78, excess grease from inside the bearing assembly can ooze out past the flange and escape through the narrow annular space 64. In this way, adequate greasing of the bearing assembly can be assured without rendering the assembly vulnerable to the entry of water or debris and without exposing the seal 70 to injury.

Now it will be appreciated that because of the shape and location of the seal 70, it can be installed inside the closure cup by a simple bonding process. Unlike seals affixed at the border of the lip portion 62 of the closure cup 18, there is no need to deform the bonded portion of the seal to cause it to contact the outer peripheral surface of the second race 14. Thus, assembly of the bearing is simplified while at the same time improving the life and performance of the seal.

Figure 3:
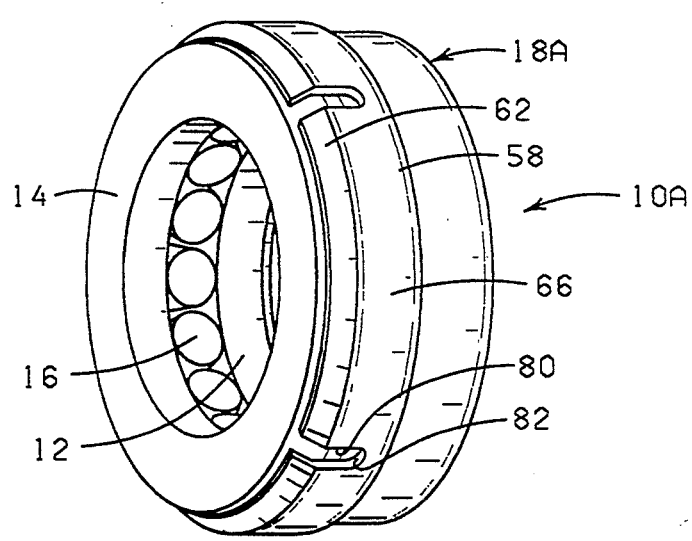
FIG. 3 is a perspective view of another embodiment of a tapered roller thrust bearing assembly constructed in accordance with the present invention.
Figure 4:
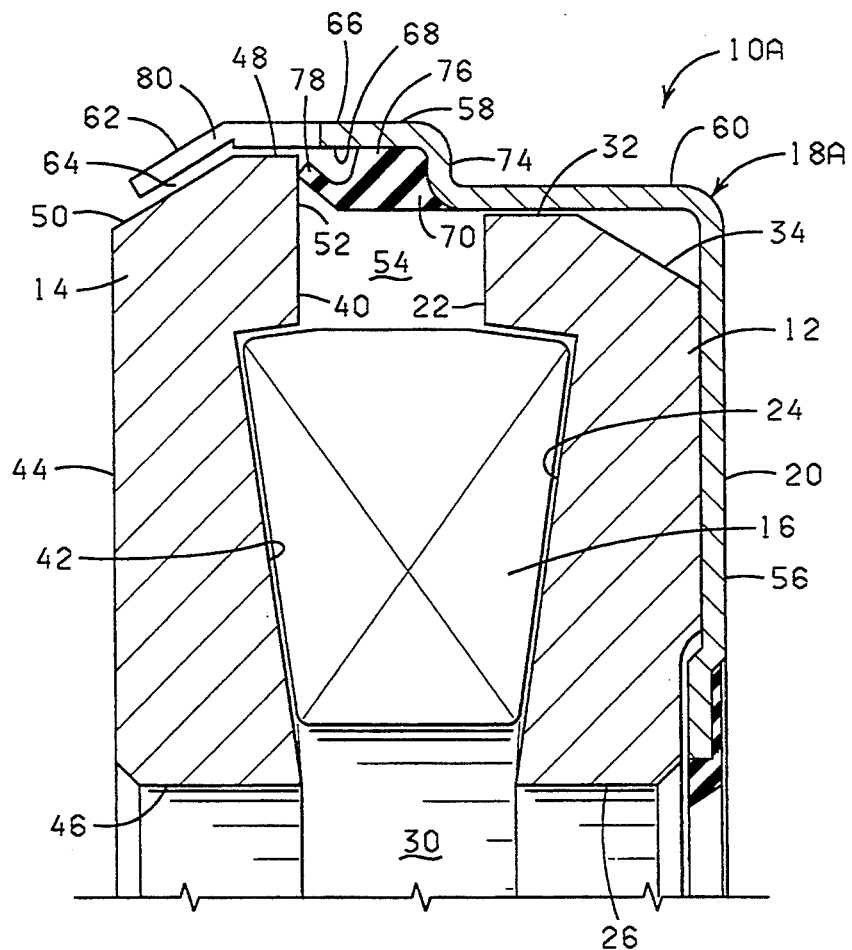
FIG. 4 is an enlarged, fragmented sectional view of the bearing assembly shown in FIG. 3.

Embodiment of FIGS. 3 and 4

During the process of manufacturing the bearing assembly 10, the lip 62 of the closure cup 18 may occasionally be too tightly crimped onto the second race 14. In this event, it may not be possible for grease to escape freely enough between the lip 62 of the closure cup 18 and the second race 14 during lubrication of the bearing assembly 10. If the closure cup 18 is so tightly crimped onto the second race 14 that no grease can escape, then pressure applied to pump grease into the bearing assembly 10 may cause dislocation of the seal 70 or a catastrophic separation of the closure cup 18 from the second race 14.

In order to alleviate this "blow-out" problem, a slotted closure cup 18A may be provided. Referring to FIGS. 3 and 4, shown therein and designated by reference character 10A is a preferred embodiment of a bearing assembly with a slotted closure cup 18A. The bearing assembly 10A may be like the bearing assembly 10 described hereinabove and in the embodiment shown in FIGS. 1 and 2, except that the bearing assembly 10A includes the slotted closure cup 18A in place of the closure cup 18.

As best seen in FIG. 3, the closure cup 18A may have just one slot, but preferably has a plurality of slots, and more preferably has four slots which extend from the open end of the closure cup 18A through the lip portion 62 and to an intermediate point of the central portion 66. One of the slots in the closure cup 18A is designated by reference numeral 80 and is generally representative of the slots in the closure cup 18A.

It should be appreciated that the slots 80 in the closure cup 18A may be provided in a wide variety of sizes, shapes and spacing arrangements. However, in one preferred embodiment, the closure cup 18A has four substantially rectangular slots 80 which are equally spaced around the open end of the closure cup 18A. As best illustrated by FIG. 3, each slot 80 may be substantially rectangular in shape, with a curved interior end portion 82.

As shown in FIG. 4, each slot 80 should extend past the annular shelf 52 of the second race 14. Thus, each slot 80 preferably communicates with the annular space 64 between the inner surface 68 of the closure cup 18A and the seal 70. With this construction, grease may escape past the flange 78 of the seal 70 and out of the closure cup 18A through the slots 80 during lubrication of the bearing assembly 10A.

Even if grease cannot exit the closure cup 18A between the non-slotted portions of the lip 62 and the second race 14, it can escape through the slots 80 to prevent a blow-out condition during lubrication of the bearing assembly 10A. However, it should be understood that grease may escape both through the slots 80 and from between the non-slotted portions of the lip 62 and the second race 14.

The slots 80 may be provided in a wide variety of arrangements. For example, the slots 80 may be holes in the central portion 66 of the closure cup 18A and may not extend into the lip portion 62. In this arrangement, the holes in the central portion 66 communicate primarily with the annular chamber 54 and secondarily with the annular space 64.

In another preferred embodiment, the slots 80 may be separate apertures in the central portion 66 and the lip portion 62 of the closure cup 18A. With this structure, the apertures in the central portion 66 communicate with the annular chamber 54 and the apertures in the lip portion 62 communicate primarily with the annular space 64.

It should be appreciated that slots 80 may or may not extend completely to the peripheral edge of the lip portion 62. However, there is an advantage in providing slots 80 which do extend completely to the peripheral edge of the lip portion 62.

Peripherally extending slots 80 in the lip portion 62 allow for more consistent crimping of the closure cup 18A onto the second race 14. Without peripherally extending slots 80, the lip 62 folds over itself haphazardly when crimped onto the second race 14. Slots 80 extending to the edge of the lip portion 62 provide take-up space for the lip portion 62 during crimping. Thus, the closure cup 18A may be consistently and uniformly crimped onto the second race 14 when at least a portion of the slots 80 extend to the peripheral edge of the lip portion 62.

Changes may be made in the combination and arrangement of the various parts, elements, steps and procedures described herein without departing from the spirit and scope of the invention as defined in the following claims.

What is claimed is:

1. A thrust bearing assembly comprising:
   a first annular race having a peripheral surface, an upper surface, an inner surface which partially defines a central bore, and a lower surface which partially defines a roller receiving recess;
   a second annular race having a peripheral surface, an upper surface which is spaced a distance from the lower surface of the first annular race to form an annular chamber therebetween and which partially defines a roller receiving recess, a lower surface, and an inner surface which partially defines a central bore;

a plurality of rollers positioned between the first and second annular races in the roller receiving recesses;

a closure cup for containing the first and second races and the rollers in operative relationship;

wherein the closure cup has a top wall which encloses the upper surface of the first annular race and a side wall extending down from the top wall which side wall encloses the peripheral surface of the first and second annular races, wherein the side wall of the closure cup has a first portion which encloses the peripheral surface of the first race, a lip portion which encloses the peripheral surface of the second race and is spaced a distance therefrom to form an annular space continuous with the annular chamber, and a central portion between the upper portion and the lip portion enclosing the annular chamber; and an annular seal attached to the inner surface of the central portion of the side wall of the closure cup, the seal having a flexible flange with a tip that contacts the upper surface of the second annular race so as to divide the annular space and the annular chamber, whereby entry of debris through the annular space into the bearing assembly is prevented and whereby escape of grease from inside the bearing assembly through the annular space is permitted;

wherein the side wall of the closure cup has at least one slot therethrough communicating with the annular chamber.

2. The thrust bearing assembly of claim 1 wherein the rollers are tapered.

3. The thrust bearing assembly of claim 1 wherein the external diameter of the second annular race is greater than the external diameter of the first annular space to provide an annular shelf portion on the second annular race which extends radially beyond the periphery of the first annular race, where the central portion of the side wall of the closure cup has a diameter greater than the diameter of the upper portion of the closure cup, wherein the flexible flange of the seal extends from the seal a distance from the inner surface of the central portion and is directed at an acute angle toward the side wall of the closure cup.

4. The thrust bearing assembly of claim 3 wherein the peripheral surface of the second annular race defines in cross section an upper straight portion and a lower inwardly sloping shoulder portion and wherein the lip portion of the side wall of the closure cup generally conforms to the upper straight portion and the lower shoulder portion, whereby the closure cup retains the first and second annular races and the rollers in operative position.

5. A thrust bearing assembly comprising:

first and second annular races sized and shaped to cooperatively define a central bore and a roller receiving recess;

a plurality of rollers positioned within the roller receiving recess;

a closure cup having a top wall and a side wall defining an opening receiving the annular races and rollers, the side wall having at least one slot positioned to permit escape of grease therethrough and cooperating with the second annular race to retain the annular races and rollers in operative relationship within the opening of the closure cup, wherein the annular races, the rollers and the inner side wall of the closure cup define an annular chamber and wherein the at least one slot communicates with the annular chamber; and an annular seal attached to the inner side wall of the closure cup and positioned within the annular chamber, the annular seal having a flexible flange in contact with the second annular race;

wherein the annular seal prevents entry of debris into the bearing assembly and permits escape of grease from inside the bearing assembly through the at least one slot through the side wall of the closure cup.

6. The thrust bearing assembly of claim 5 wherein the rollers are tapered.

7. The thrust bearing assembly of claim 5 wherein the external diameter of the second annular race is greater than the external diameter of the first annular race to provide an annular shelf portion on the second annular race which extends radially beyond the periphery of the first annular race.

8. The thrust bearing assembly of claim 5 wherein the central portion of the side wall of the closure cup has a diameter greater than the diameter of the upper portion of the closure cup.

9. The thrust bearing assembly of claim 5 wherein the central portion of the side wall of the closure cup has a diameter greater than the diameter of the lower portion of the closure cup.

10. The thrust bearing assembly of claim 5 wherein the flexible flange of the annular seal is directed at an acute angle toward the inner side wall of the closure cup.

11. The thrust bearing assembly of claim 5 wherein the sidewall of the closure cup has four slots therethrough.

12. The thrust bearing assembly of claim 5 wherein at least one of the slots extends to the peripheral edge of the sidewall of the closure cup.

13. The thrust bearing assembly of claim 5 wherein the slots are equally spaced around the sidewall of the closure cup.

14. The thrust bearing assembly of claim 5 wherein the peripheral surface of the second annular race defines in cross section an upper straight portion and a lower inwardly sloping shoulder portion and wherein the side wall of the closure cup generally conforms to the upper straight portion and the lower shoulder portion whereby the closure cup retains the annular races and the rollers in operative position.

15. The thrust bearing assembly of claim 5 wherein the annular seal is an elastomeric seal.

16. The thrust bearing assembly of claim 5 wherein a lower portion of the side wall of the closure cup is bent inwardly toward the second annular race to secure the annular races and the rollers in operative relationship.

17. The thrust bearing assembly of claim 16 wherein the lower portion of the side wall of the closure cup and the second annular race define a space therebetween for escape of grease from the bearing assembly.

18. The thrust bearing assembly of claim 5 wherein the side wall of the closure cup and the second race define an annular space.

19. The thrust bearing assembly of claim 18 wherein at least one of the slots through the side wall of the closure cup communicates with the annular space.

20. A thrust bearing assembly comprising:

first and second annular races sized and shaped to cooperatively define a central bore and a roller receiving recess;

a plurality of rollers positioned within the roller receiving recess;

a closure cup having a top wall and a side wall defining an opening receiving the annular races and rollers, the side wall having at least one slot positioned to permit escape of grease therethrough and cooperating with the second annular race to retain the annular races and rollers in operative relationship within the opening of the closure cup, wherein the annular races, the rollers and the inner side wall of the closure cup define an annular chamber, wherein the second race and the closure cup define an annular space, and wherein the at least one slot communicates with the annular space; and an annular seal attached to the inner side wall of the closure cup and positioned within the annular chamber, the annular seal having a flexible flange in contact with the second annular race;

wherein the annular seal prevents entry of debris into the bearing assembly and permits escape of grease from inside the bearing assembly through the at least one slot of the side wall of the closure cup.

21. The thrust bearing assembly of claim 20 wherein the side wall of the closure cup has four slots therethrough.

22. The thrust bearing assembly of claim 21 wherein the slots are equally spaced around the side wall of the closure cup.

23. The thrust bearing assembly of claim 20 wherein at least one of the slots extends to the peripheral edge of the side wall of the closure cup.

* * * * *